(12) United States Patent
Thai

(10) Patent No.: US 12,409,011 B2
(45) Date of Patent: Sep. 9, 2025

(54) DENTAL MATRIX BANDS

(71) Applicant: Hung M. Thai, San Jose, CA (US)

(72) Inventor: Hung M. Thai, San Jose, CA (US)

( * ) Notice: Subject to any disclaimer, the term of this patent is extended or adjusted under 35 U.S.C. 154(b) by 691 days.

(21) Appl. No.: 17/360,899

(22) Filed: Jun. 28, 2021

(65) Prior Publication Data

US 2021/0322135 A1 Oct. 21, 2021

Related U.S. Application Data

(63) Continuation-in-part of application No. 16/239,062, filed on Jan. 3, 2019, now Pat. No. 11,045,280, which is a continuation-in-part of application No. 15/980,414, filed on May 15, 2018, now Pat. No. 10,524,878.

(51) Int. Cl.
*A61C 5/85* (2017.01)

(52) U.S. Cl.
CPC ...................................... *A61C 5/85* (2017.02)

(58) Field of Classification Search
CPC .... A61C 5/85; A61C 5/88; A61C 5/77; A61C 5/80; A61C 19/04; A61C 9/0033; A61C 13/34
USPC ......................................................... 433/226
See application file for complete search history.

(56) References Cited

U.S. PATENT DOCUMENTS

| | | | |
|---|---|---|---|
| 340,896 A | 4/1886 | Starr | |
| 816,828 A | 4/1906 | Smith | |
| 1,688,670 A | 10/1928 | Swendiman | |
| 2,123,475 A | 7/1938 | Sachs | |
| 2,698,483 A | 1/1955 | Berkowitz | |
| 3,305,928 A | 2/1967 | Tofflemire | |
| 3,521,510 A | 7/1970 | Angquist | |
| 3,626,995 A | 12/1971 | Keenan, Jr. | |
| 3,842,505 A | 10/1974 | Eames | |
| 4,081,909 A | 4/1978 | Garcia | |
| 4,563,152 A | 1/1986 | McClure | |
| 5,330,353 A | 7/1994 | Wavrin | |
| 6,336,387 B1 | 1/2002 | Lee | |
| 6,345,983 B1 | 2/2002 | Godfrey | |
| 6,712,608 B2 | 3/2004 | Bills | |
| 2003/0224324 A1 | 12/2003 | Dryer | |
| 2004/0106084 A1 | 6/2004 | Dryer | |

(Continued)

FOREIGN PATENT DOCUMENTS

DE 202017006673 U1 1/2018

*Primary Examiner* — Eric J Rosen
*Assistant Examiner* — Mirayda A Aponte
(74) *Attorney, Agent, or Firm* — NGUYEN TARBET IP LAW

(57) ABSTRACT

Dental matrix bands with novel surface structures and use thereof in dental procedures are described herein. The matrix band features a three-dimensional surface structure that is contoured to an outer portion of a torus to allow the matrix band to securely fit around a tooth. The matrix band has an outer surface of the matrix band; an upper and lower edge of the matrix band; a proximal and distal end of the matrix band; and a concave ridge disposed along the band. The outer surface of the band forms a first convex curve between the upper edge and the lower edge of the band and a second convex curve between the proximal and the distal end of the band. The concave ridge may extend between the upper edge and the lower edge of the band and between the proximal and distal ends of the band.

3 Claims, 4 Drawing Sheets

(56) References Cited

U.S. PATENT DOCUMENTS

| | | |
|---|---|---|
| 2004/0146838 A1 | 7/2004 | Nugiel |
| 2005/0089814 A1* | 4/2005 | Slone .................. A61C 5/85 |
| | | 433/39 |
| 2005/0287491 A1 | 12/2005 | Slone |
| 2008/0294190 A1 | 11/2008 | Young |
| 2017/0065371 A1 | 3/2017 | Ferrer |

* cited by examiner

DENTAL MATRIX BANDS

CROSS-REFERENCES TO RELATED APPLICATIONS

This application is a continuation-in-part and claims benefit of U.S. patent application Ser. No. 16/239,062, filed Jan. 3, 2019, which is a continuation-in-part and claims benefit of U.S. patent application Ser. No. 15/980,414, filed May 15, 2018 (now U.S. Pat. No. 10,524,878), the specification(s) of which is/are incorporated herein in their entirety by reference.

BACKGROUND OF THE INVENTION

Field of the Invention

The present invention relates to a dental accessory, more particularly, to a matrix band that fits securely to a tooth for use in dental procedures.

Dental caries, also referred to as tooth decay, are permanently damaged structures of the tooth that are typically caused by plaque, bacteria, excessive sugar consumption, and improper or inadequate oral hygiene. Cavities caused by the tooth decay/caries often require treatment by restoration of the decayed tooth. During treatment, a dentist generally uses a dental handpiece and dental burs to remove all of the decayed structure from the tooth. After removing the caries, the tooth is left having a cavity. The dentist will place a dental matrix band around the tooth to provide temporary structural support, e.g. wall, to the cavity. The cavity is then filled with a dental filling material, such as composite resins, cement, ceramics, or dental amalgams, which is allowed to cure and set, thereby re-establishing the tooth structure. In some cases, the new restoration creates a better structure than the original structure in terms of tighter proximal contact with the adjacent tooth, which reduces food being stuck or wedged in between teeth.

Description of Related Art Including Information Disclosed

Dental matrix bands, including but not limited to those disclosed in U.S. Pat. No. 3,305,928 of Tofflemire, U.S. Pat. No. 5,330,353 of Wavrin, and U.S. Pat. No. 6,712,608 of Bills, are used to restore anatomic contours and contact areas of the tooth. Existing matrix bands used in dentistry today are typically metallic strips that may have a flat surface or concave contour. A flat matrix band may be burnished or shaped to add a concave contour. For example, U.S. Pat. No. 4,081,909 of Garcia discloses an orthodontic plier for bending orthodontic arch wires. If a matrix band is shaped with the plier of Garcia, the band would acquire a concave contour. One disadvantage of a concave contour is that it creates a rounded point of contact to an adjacent tooth. This rounded point of contact lacks stability and is more prone to breaking, thus the filling will require future restoration. In addition, other bands often fail to restore proximal anatomy, may have thin contact, may create a large food trap, may increase likelihood of fracture, and/or may cause occlusal interference, recurrent caries, and/or periodontal disease.

BRIEF SUMMARY OF THE INVENTION

The present invention features a dental matrix band. The matrix band features a three-dimensional surface structure that is contoured along an outer portion of a torus. The band may comprise: a) an outer surface of the band; b) an upper edge of the band and a lower edge of the band, wherein the outer surface of the band has a first convex curvature between the upper edge of the band and the lower edge of the ban; c) a proximal end of the band and a distal end of the band, wherein the outer surface of the band has a second convex curvature between the proximal end of the band and the distal end of the band; and d) a ridge disposed along the band, between the upper edge and the lower edge of the band and between the proximal and distal ends of the band.

According to another embodiment, the matrix band may be used for a dental procedure, for example, during a restoration procedure for restoring a tooth having caries. The method may comprise removing the caries from the tooth thereby forming at least one cavity in the tooth, placing the matrix band at least partially around the tooth so as to provide structural support to the cavity and filling the cavity with a dental filler material. Preferably, the ridge of the matrix band is positioned adjacent to a neighboring tooth so as to form a broad, concave surface to a restored portion of the tooth that contacts or is adjacent to the neighboring tooth. The ridge is concave so that the ridge engages the adjacent tooth in a flush way.

One of the unique and inventive technical features of the present invention is a concave ridge on the midsection of the band. Without wishing to limit the invention to any theory or mechanism, it is believed that the technical feature of the present invention advantageously protrudes out to form a concave ridge that wraps around an adjacent tooth better. The ridge results in a newly restored tooth that has a broad surface contact with the adjacent tooth instead of a rounded point of contact. This configuration allows for tighter proximal contact with the adjacent tooth, which may prevent food from getting stuck between the teeth and is more stable than having a rounded point of contact. None of the presently known prior references or work has the unique inventive technical feature of the present invention.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF SEVERAL VIEWS OF THE DRAWINGS

The features and advantages of the present invention will become apparent from a consideration of the following detailed description presented in connection with the accompanying drawings in which:

FIG. 3A shows an embodiment of the present invention where the ridge is on a section of the matrix band; FIG. 3B shows an embodiment of the present invention where the ridge is on a section of the matrix band and sticks out more than the ridge of FIG. 3A. FIG. 3C shows an embodiment of the present invention where the ridge spans an entire height of the matrix band and has a concavity in the middle of the ridge. FIG. 3D shows an embodiment of the present invention where the ridge spans an entire width of the matrix band.

DETAILED DESCRIPTION OF THE INVENTION

Figure 1:
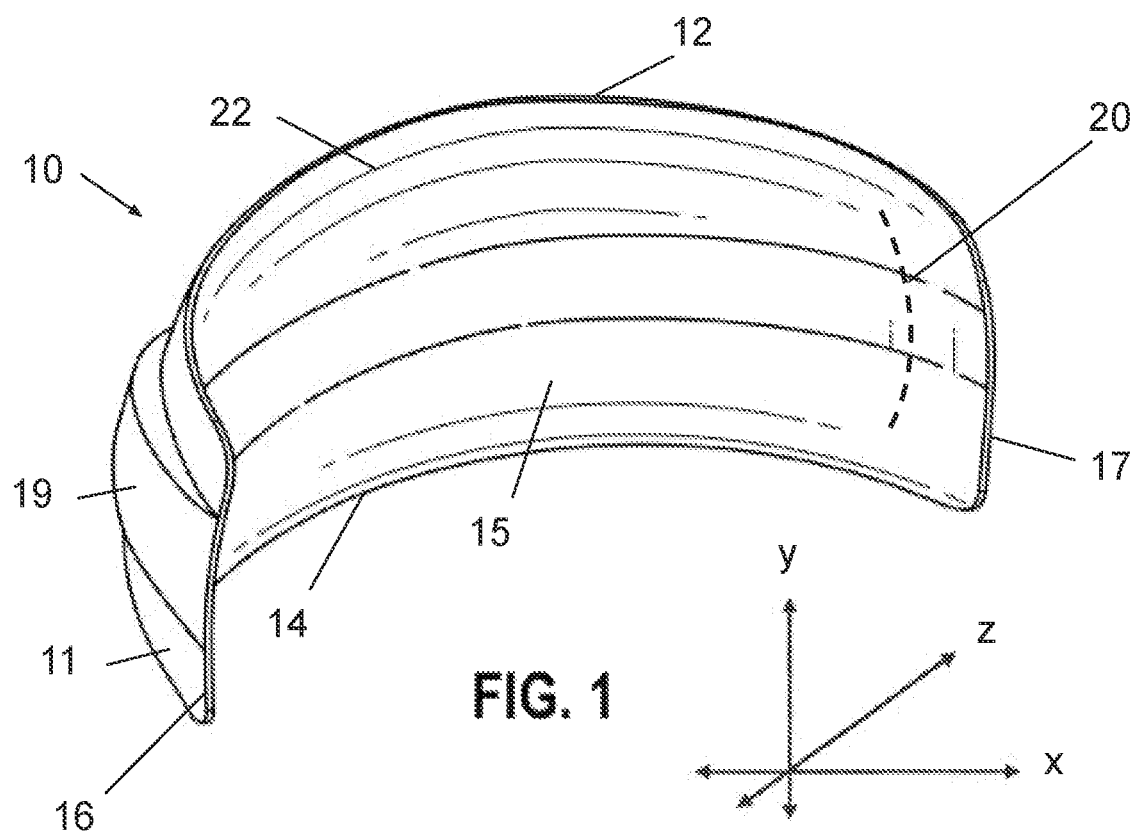
FIG. 1 shows a perspective view of one embodiment of the present invention. In this embodiment, the ridge spans the entire width of the matrix band.

Following is a list of elements corresponding to a particular element referred to herein:
10 matrix band
11 matrix band outer surface
12 matrix band upper edge
14 matrix band lower edge
15 matrix band inner surface
16 matrix band proximal end
17 matrix band distal end
19 ridge
20 convex curve 1 (vertical)
22 convex curve 2 (horizontal)
25 matrix band upper projection
26 matrix band lower projection As used herein, the term "torus" refers to a surface of revolution generated by revolving a circle in three-dimensional space about an axis coplanar with the circle. In some embodiments, a portion of a surface of a dental matrix band may be shaped or contoured similar to a torus. If the axis of revolution does not touch the circle, the surface has a ring shape and is called a torus of revolution. As an example, a torus may be donut-shaped.

As used herein, the term "convex" refers to being curved like the exterior of a circle or sphere, or having at least one interior angle measuring less than 180°. With respect to the dental band, the outer surface of the band is convex.

As used herein, the term "concave" refers to being curved like the interior of a circle or sphere, or having at least one interior angle greater than 180°. With respect to the dental band, the inner surface of the band is concave, in direct contact with the tooth being restored.

As used herein, the midsection is defined as middle location equidistant from a topmost point or top edge and from a lowermost point or bottom edge.

As used herein, the term "height" refers to the distance between a top edge and a bottom edge of a specified structure. As used herein, the term "width" refers to the distance between a first side edge and a second, opposing side edge of a specified structure.

Figure 2:
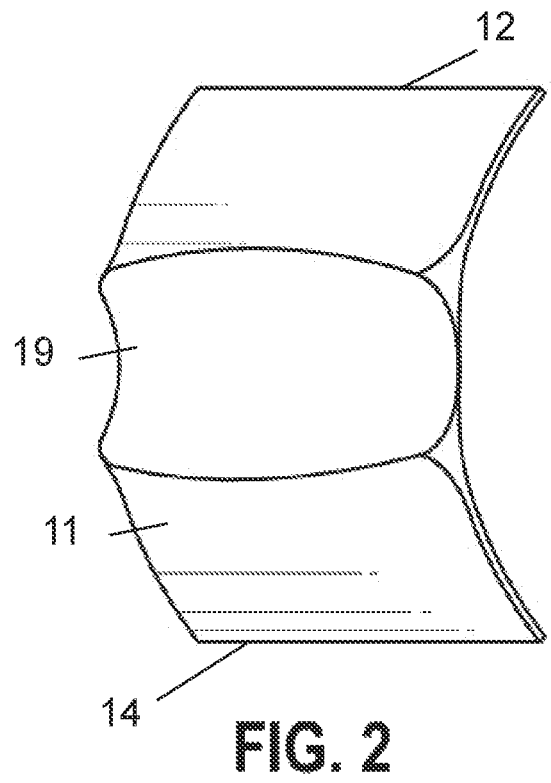
FIG. 2 shows a close-up view of a segment of the embodiment where the ridge spans the entire width of the matrix band
Figure 3A:
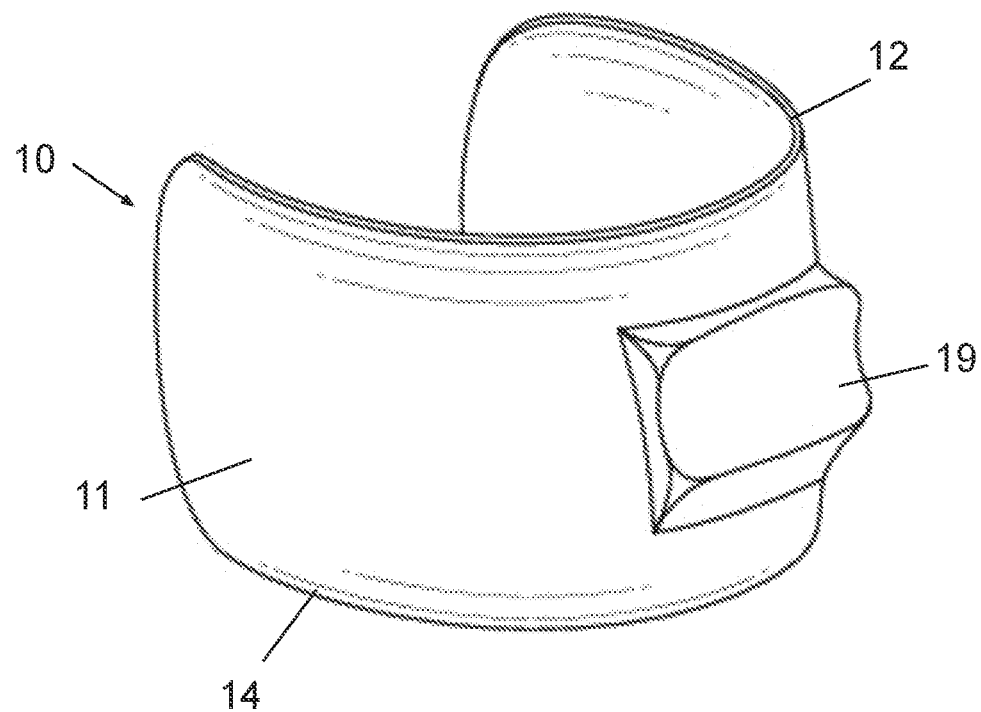
FIGS. 3A-3D show a perspective view of other embodiments of the present invention where the ridge is on a section of the matrix band.
Figure 3B:
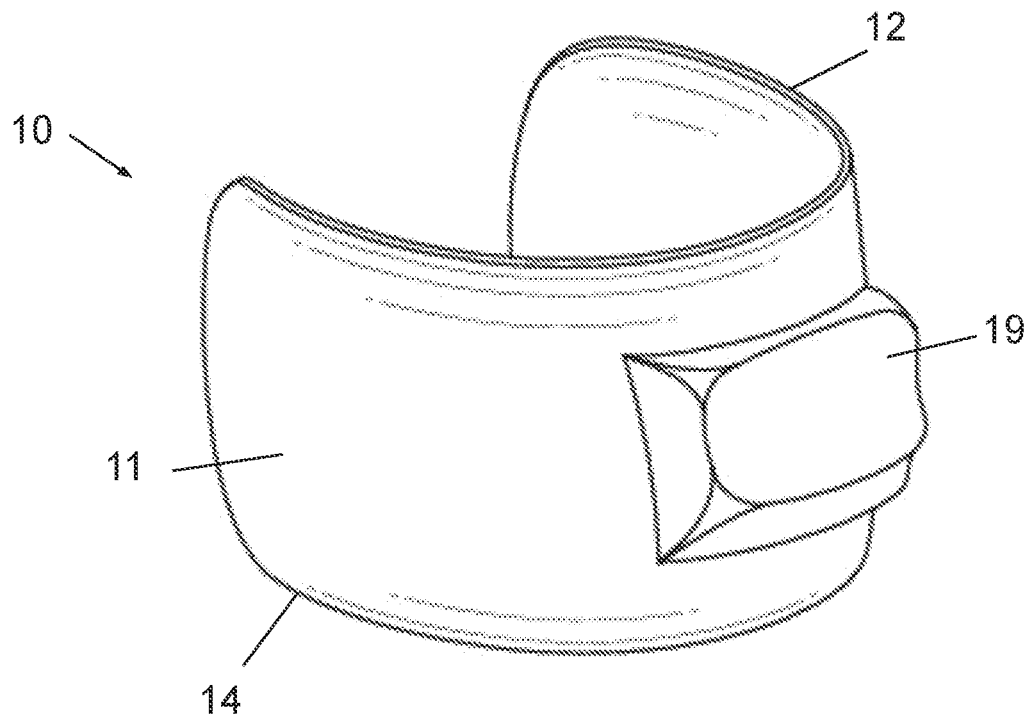
Figure 3C:
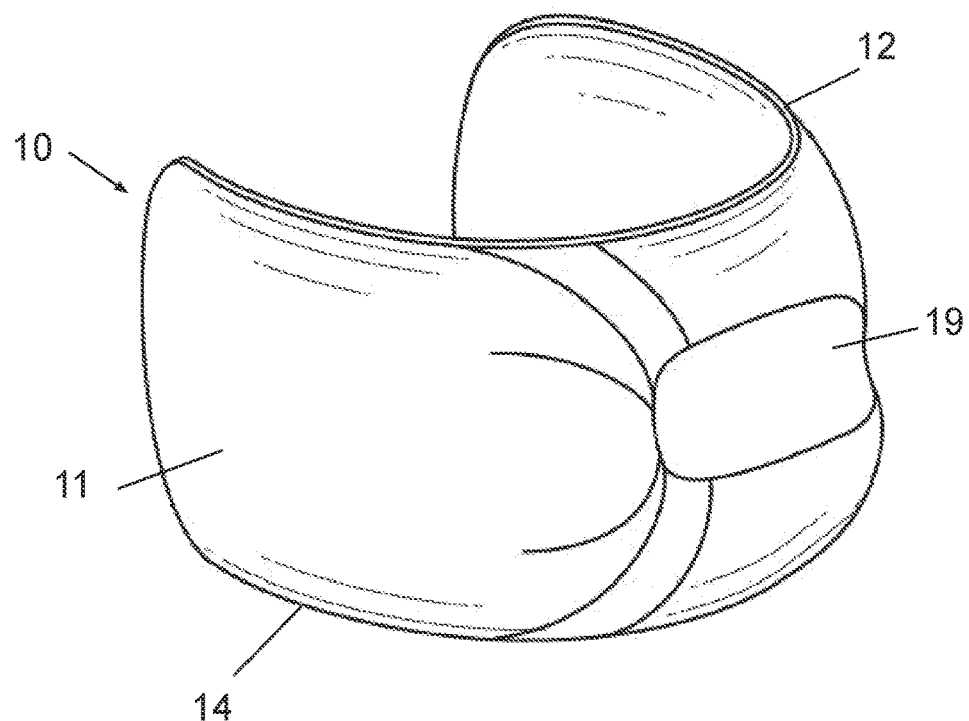
Figure 3D:
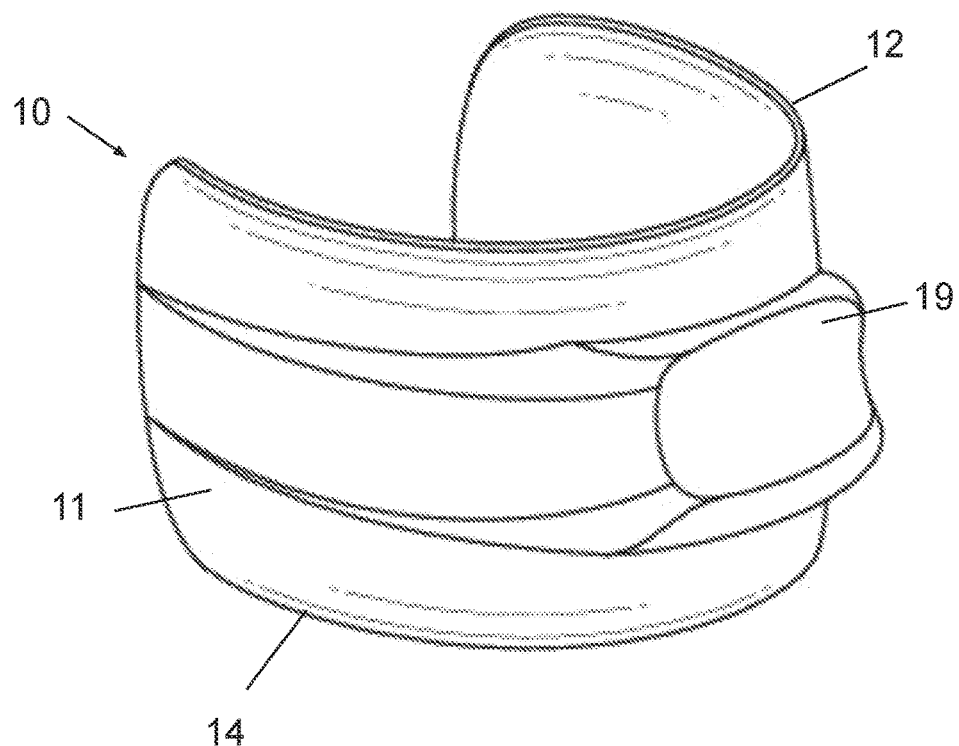
Figure 4:
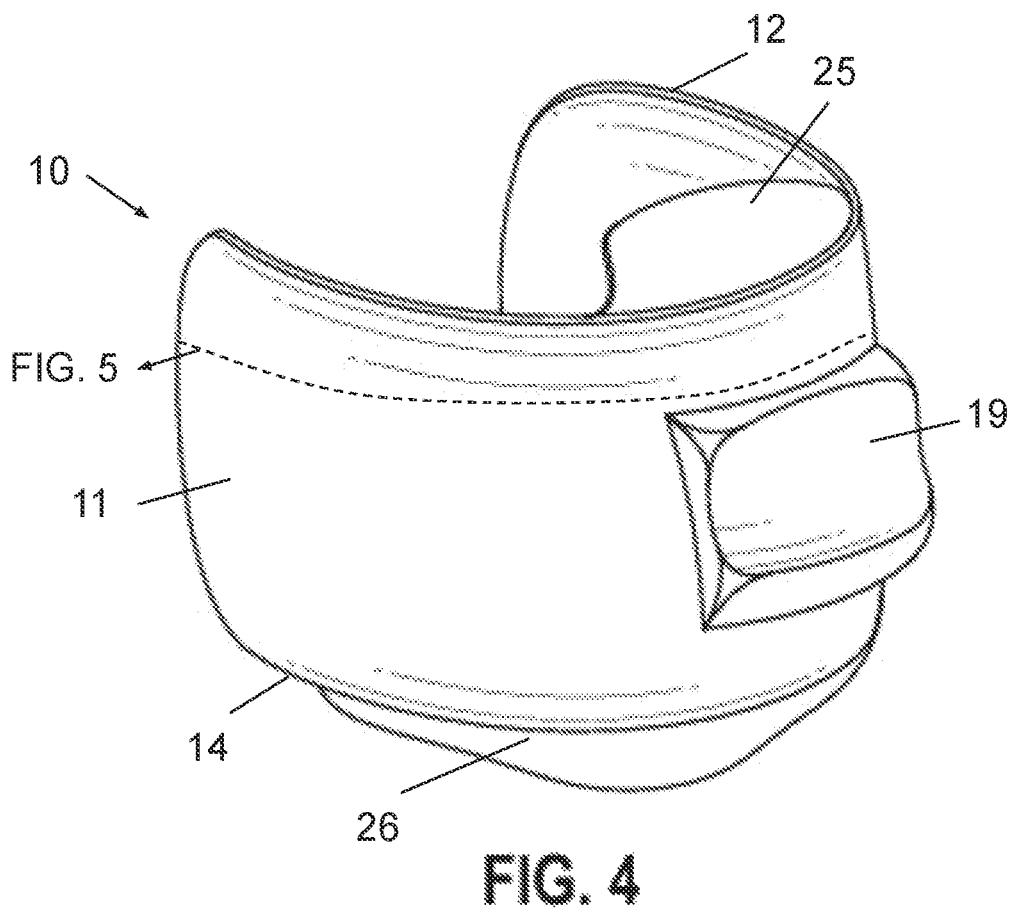
FIG. 4 shows a perspective view of another embodiment of the present invention where the ridge is on a section of the matrix band and the matrix band has a projection disposed along the top and bottom of the matrix band.
Figure 5:
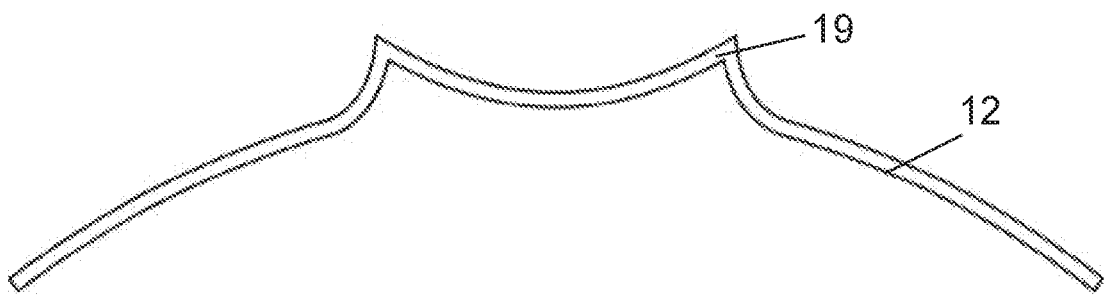
FIG. 5 shows a cross sectional view from the embodiment where the ridge is on a section of the matrix band.

Referring now to FIGS. 1-2, the present invention features a matrix band (10) for dental procedures. The matrix band (10) comprises an outer surface (11) that wraps around the Z-axis, an upper edge (12), a lower edge (14), a proximal end (16), a distal end (17), and a ridge (19) disposed along the surface. In some embodiments, the ridge (19) is disposed on a midsection of the matrix band (10) or any specific section of the matrix band (depending on a preference of the dentist and/or contour of the tooth). In preferred embodiments, from the outer surface (11) of the matrix band (10), the ridge (19) is concave in both an x-direction and a y-direction. Without wishing to limit the present invention to any theory or mechanism, the concave ridge provides a concave surface for optimal contact between adjacent teeth.

In other embodiments, the ridge (19) is disposed between the upper edge (12) and the lower edge (14) of the matrix band (10) and between the proximal and distal ends of the matrix band (10). In some embodiments, the outer surface (11) of the matrix band (10) forms a first convex curve (20) between the upper edge (12) of the matrix band (10) and the lower edge (14) of the matrix band (10). In other embodiments, the outer surface of the matrix band (10) forms a second convex curve (22) between the proximal end (16) of the matrix band (10) and the distal end (17) of the matrix band (10).

In some embodiments, the matrix band has a projection (25) along the upper edge of the matrix band (10) on a midsection or any specific section of the upper edge of the matrix band depending on a preference of the dentist and/or contour of the tooth. In other embodiments, the matrix band (10) has a projection (26) along the lower edge of the matrix band (10) on a midsection or any specific section of the lower edge of the matrix band depending on a preference of the dentist and/or contour of the tooth. The upper projection (25) may provide a gripping means for setting or removing the matrix band (10). The lower projection (26) may rest upon the gums surrounding the tooth, thereby providing additional stability to the matrix band (10).

The present invention also features a matrix band that can be used in dental procedures. A non-limiting example comprises the use of the dental matrix band (10) during a tooth restoration procedure. In some embodiments, the present invention features a method of restoring a tooth having caries. The method may comprise removing the caries from the tooth, thereby forming at least one cavity in the tooth and providing the matrix band (10), which has a ridge (19) disposed on a midsection of the matrix band. The restoration method continues with placing the matrix band (10) at least partially around the tooth so as to provide structural support to the cavity and filling the cavity with a dental filler material, which is allowed to cure and/or set. Preferably, the ridge (19) is positioned adjacent to a neighboring tooth. For example, the ridge (19) is positioned between the cavity and the neighboring tooth.

After the filler material has set and hardened, the matrix band (10) is removed, thereby leaving the restored tooth. Without wishing to limit the invention to a particular theory or mechanism, the ridge (19) of the matrix band provides a broad, concave surface to a restored portion of the tooth that contacts or is adjacent to the neighboring tooth. This broad concave surface wraps around an adjacent tooth better than a rounded or flat surface, which can extend the lifetime of the restored portion.

In some embodiments, the inner surface of the matrix band (10) has a contour, taken from a cross-section between the top and bottom edges of the matrix band (10) at the midsection, comprising a first concave segment that transitions to the concave ridge, which transitions to a second concave segment (FIG. 2). This contour of the matrix band allows for the restored portion of the tooth that is adjacent to the neighboring tooth to have a contour comprising a convex curvature near the occlusal surface that transitions to a concave surface adjacent to the neighboring tooth, which transitions to a convex curvature in the apical direction.

Non-limiting examples of the dental matrix band comprise a metallic strip or clear plastic strip having a concave inner surface prior to shaping from the top to the bottom edges. The midsection of the matrix band is a central area disposed between the top and bottom edges of the matrix band. Further still, the midsection may be disposed between the side edges of the matrix band. Unlike existing matrix bands, in some preferred embodiments, the matrix band of the present invention includes a ridge formed and centrally disposed on at least a midsection of the matrix band. As shown in FIGS. 1-5, the matrix band has a ridge. In other embodiments, the matrix band has a ridge that may span the entire width (from side to side) of the matrix band.

According to another embodiment, the present invention further features a dental matrix band comprising a band (outer) surface (11) bounded by an upper edge (12), a lower edge (14) opposite of the upper edge (12), a first end (16), and a second end (17) opposite of the first end (16), wherein the band surface has a convex curvature (20) between the upper edge (12) and the lower edge (14); and a ridge (19) disposed on the band surface (11). In preferred embodiments, from the outer surface (11) of the matrix band (10), the ridge (19) is concave in both an x-direction and a y-direction. In other embodiments, the ridge (19) is disposed in a midsection between the upper edge and the lower edge of the matrix band surface.

In some embodiments, the dental matrix band is of appropriate stiffness to allow optimal placement between teeth without requiring wedging. The material of the dental matrix band comprises a suitable thickness and flexibility to prevent tearing or crumbling of the matrix band (10). Non-limiting examples of the material of dental matrix band comprise metal or clear plastic (e.g., light-cured composite resin). Non-limiting examples of the metal material include aluminum, silver, stainless steel, metal, composite, or combination thereof.

In some embodiments, the height of the dental matrix band comprises a height that sufficiently extends between top and bottom edges of a tooth with the upper projection extending a sufficient height to allow the placement utensil to effectively hold or grip the matrix band using the upper projection for simple and accurate placement and/or removal of the dental matrix band.

In some embodiments, the height of the dental matrix band may range from about 5 mm to 12 mm, or at least an entire height of a tooth. For example, the height of the matrix band (10) may be 12 mm for a 10 mm tooth height. In some other embodiments, the width of the dental matrix band may range from about 10 to 30 mm or about 20 to 40 mm. In some other embodiments, the width of the dental matrix band encompasses the entire perimeter of a tooth.

In some embodiments, the area of the ridge may encompass a portion of the entire height and width of the dental matrix band. In other embodiments, the ridge may encompass about at least ¾, ½, ¼, or ⅛ of the area of the dental matrix band. Non-limiting examples of the width of the ridge include at least about 2 mm, 3 mm, 4 mm, 5 mm, 40 mm, or at most 40 mm. Non-limiting examples of the height of the ridge include at least about 2 mm, 3 mm, 5 mm, 7 mm, or at most 7 mm. In preferred embodiments, a cross-section of the outer surface of the matrix band taken from upper edge to lower edge transitions from a first convex segment to the concave ridge, which transitions to a second convex segment.

In some embodiments, the height of the upper projection may range from about ½ mm to about 5 mm. In other embodiments, the width of the upper projection can span a portion or the entire width of the upper edge. In other embodiments, the height of the lower projection may range from about ½ mm to about 5 mm. In other embodiments, the width of the lower projection can span a portion or the entire width of the lower edge.

In appropriate circumstances, the dental matrix band has a non-stick coating to reduce composite adhesion. For example, the non-stick coating comprises Teflon.

As used herein, the term "about" refers to plus or minus 10% of the referenced number.

The disclosures of the following U.S. patents are incorporated in their entirety by reference herein: U.S. Pat. Nos. 2,698,483, 4,081,909, US20040106084, U.S. Pat. Nos. 3,305,928, 530,353, 6,712,608.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A matrix band (10) configured to be placed around at least a portion of a circumference of a tooth, comprising:
   a. a band surface (11) bounded by an upper edge (12), a lower edge (14) opposite of the upper edge (12), a first end (16), and a second end (17) opposite of the first end (16), wherein the matrix band surface has a convex curvature (20) between the upper edge (12) and the lower edge (14); and
   b. a ridge (19) protruding from the matrix band surface (11) between the upper edge (12) and the lower edge (14) of the matrix band (10) and between the first end (16) and the second end (17) of the matrix band (10), the ridge comprising a concave surface in a position vertically centered on the matrix band (10), wherein the ridge (19) acts as a broad contact surface with an interproximal area of a neighboring tooth adjacent to the tooth.

2. The matrix band (10) of claim 1, wherein from the outer surface (11) of the matrix band (10), the ridge (19) is concave in an x direction.

3. The matrix band (10) of claim 1, wherein from the outer surface (11) of the matrix band (10), the ridge (19) is concave in a y direction.

* * * * *